(12) United States Patent
Hung

(10) Patent No.: US 9,438,086 B2
(45) Date of Patent: Sep. 6, 2016

(54) ELECTRIC PUSH BAR ASSEMBLY

(71) Applicant: MOTECK ELECTRIC CORPORATION, New Taipei (TW)

(72) Inventor: Chih-Li Hung, New Taipei (TW)

(73) Assignee: MOTECK ELECTRIC CORPORATION, New Taipei (TW)

( * ) Notice: Subject to any disclaimer, the term of this patent is extended or adjusted under 35 U.S.C. 154(b) by 392 days.

(21) Appl. No.: 14/180,804

(22) Filed: Feb. 14, 2014

(65) Prior Publication Data

US 2014/0312724 A1 Oct. 23, 2014

(30) Foreign Application Priority Data

Apr. 19, 2013 (TW) .............................. 102113986 A

(51) Int. Cl.
| | |
|---|---|
| *H02K 7/116* | (2006.01) |
| *H02K 7/108* | (2006.01) |
| *H02K 7/06* | (2006.01) |
| *F16H 25/20* | (2006.01) |

(52) U.S. Cl.
CPC ............. *H02K 7/1166* (2013.01); *F16H 25/20* (2013.01); *H02K 7/06* (2013.01); *H02K 7/108* (2013.01); *F16H 2025/209* (2013.01); *F16H 2025/2031* (2013.01); *F16H 2025/2071* (2013.01); *F16H 2025/2084* (2013.01)

(58) Field of Classification Search
CPC ................. F16H 2025/2071; F16H 2025/209; H02K 7/108; H02K 7/1166
See application file for complete search history.

(56) References Cited

U.S. PATENT DOCUMENTS

| | | | |
|---|---|---|---|
| 6,240,800 B1* | 6/2001 | Bokamper | A47C 20/041 74/500 |
| 2005/0103928 A1* | 5/2005 | Flatt | B64C 13/24 244/10 |
| 2014/0202271 A1* | 7/2014 | Oberndorfer | H02K 7/06 74/89.37 |
| 2014/0260730 A1* | 9/2014 | Wu | F16H 25/20 74/89.23 |

* cited by examiner

*Primary Examiner* — Terence Boes
(74) *Attorney, Agent, or Firm* — Muncy, Geissler, Olds & Lowe, P.C.

(57) ABSTRACT

An electric push bar assembly includes an electric push bar including a retractable tube and a connector, and a release mechanism including a connection socket connected to the retractable tube, a fixed socket connected to the connector, a clutch socket axially slidably coupled to the connection socket and having a plurality of engagement tooth blocks respectively engaged with respective engagement teeth of the fixed socket and a rotary operating member mounted around the fixed socket and operable to disengage the engagement tooth blocks of the clutch socket from the engagement teeth of the fixed socket for allowing adjustment of the retractable tube manually.

8 Claims, 12 Drawing Sheets

ELECTRIC PUSH BAR ASSEMBLY

This application claims the priority benefit of Taiwan patent application number 102113986, filed on Apr. 19, 2013.

BACKGROUND OF THE INVENTION

1. Field of the Invention

The present invention relates to electric push bar technology, and more particularly to an electric push bar assembly having a release mechanism coupled between a retractable tube and a connector and operable for enabling a retractable tube thereof to be retracted manually when power failed or when the electric push bar assembly is damaged.

2. Description of the Related Art

Various types of electric push bars with different mechanical designs and transmission mechanisms are widely used in electric beds, electric massage chairs, lifters, exercisers and fitness machines. These electric push bars commonly use a motor drive to rotate a transmission mechanism, causing a retractable tube to extend out or to retract for elevation adjustment. In case of emergency, a user can operate an internal clutch device of the electric push bar to release the retractable tube from the load, allowing the load to be lowered rapidly. However, when the retractable tube is released with the internal clutch device from the load, the load will fall suddenly, causing an impact or accidental damage or personal injury.

FIG. 12 illustrates an electric push bar assembly according to the prior art. According to this prior art design, the electric push bar assembly comprises an electric push bar D, and a release mechanism. The electric push bar D comprises a retractable tube D1, a transmission screw (not shown) rotatable by a power drive through a gear set to cause linear movement of the retractable tube D1, and a connector D2 connected to the load (for example, electric bed or electric massage chair). The release mechanism comprises a first socket A connected to the retractable tube D1 of the electric push bar D, a second socket B connected to the connector D2 and movably coupled to the first socket A, and a clutch module C formed of a barrel C1, a first clutch ring plate C2 and a second clutch ring plate C3 mounted on the barrel C1. If the second clutch ring plate C3 is not released, two internal engagement teeth C11 of the barrel C1 are respectively engaged with two locating grooves D11 of the retractable tube D1. At this time, the connector D2 is movable with the retractable tube D1 for elevation or angular position adjustment.

When the clutch module C is released, the internal engagement teeth C11 of the barrel C1 are disengaged from the respective locating grooves D11 of the retractable tube D1. Thus, the retractable tube D1 can be retracted, allowing the load to be rapidly lowered. However, when the load is lowered rapidly, an impact, accidental damage or personal injury may occur. Therefore, this prior art design is still not safe in use. An improvement in this regard is desired.

SUMMARY OF THE INVENTION

The present invention has been accomplished under the circumstances in view. It is one object of the present invention to provide an electric push bar assembly, which has a release mechanism installed therein that is operable for enabling the retractable tube of the electric push bar to be retracted manually when power failed or when the electric push bar assembly is damaged. It is another object of the present invention to provide an electric push bar assembly, which facilitates fabrication, saves installation space and manufacturing costs.

To achieve these and other objects of the present invention, an electric push bar assembly of the present invention comprises an electric push bar and a release mechanism. The electric push bar comprises a shell member, a gear set mounted in the shell member, a power drive adapted for rotating gear set, a transmission mechanism having a transmission screw coupled to and rotatable by the gear set, a retractable tube coupled to the transmission screw and movable linearly upon rotation of the transmission screw, and a connector connected to one end of the retractable tube opposite to the transmission screw through the release mechanism. The release mechanism comprises a connection socket connected to the retractable tube, a fixed socket connected to the connector and having a plurality of engagement teeth equiangularly spaced around the periphery thereof, a clutch socket axially slidably coupled to the connection socket and having a plurality of engagement tooth blocks equiangularly disposed at a front side thereof and respectively engaged with the engagement teeth of the fixed socket and a plurality of pushing blocks located on an outer perimeter thereof, and a rotary operating member mounted around the fixed socket. The rotary operating member comprises a ring shell having a plurality of push blocks located on an inner perimeter thereof and stopped against the pushing blocks of the clutch socket for enabling the clutch socket to be moved by the rotary operating member to disengage the engagement tooth blocks from the engagement teeth upon rotation of the ring shell by an external force.

Preferably, the connection socket of the release mechanism comprises a plurality of axial rails equiangularly spaced around an outer perimeter thereof, and a plurality of spring members axially mounted in the outer perimeter thereof and respectively disposed between each two adjacent axial rails. Further, the clutch socket is supported on the spring members of the connection socket, comprising a plurality of axial sliding grooves respectively coupled to the axial rails of the connection socket for enabling the clutch socket to be moved simply in axial direction relative to the connection socket.

Further, the clutch socket of the release mechanism comprises a plurality of spacer grooves respectively defined between each two adjacent pushing blocks. Further, the ring shell of the rotary operating member further comprises a plurality of stopper ribs respectively suspending in the spacer grooves of the clutch socket to limit the angle of rotation of the rotary operating member relative to the clutch socket.

Further, each engagement tooth block of the clutch socket defines a stepped lateral stop edge stopped against one respective engagement tooth of the fixed socket, and a beveled front guide edge movable by one push block of the ring shell of the rotary operating member to disengage the engagement tooth blocks of the clutch socket from the engagement teeth of the fixed socket.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
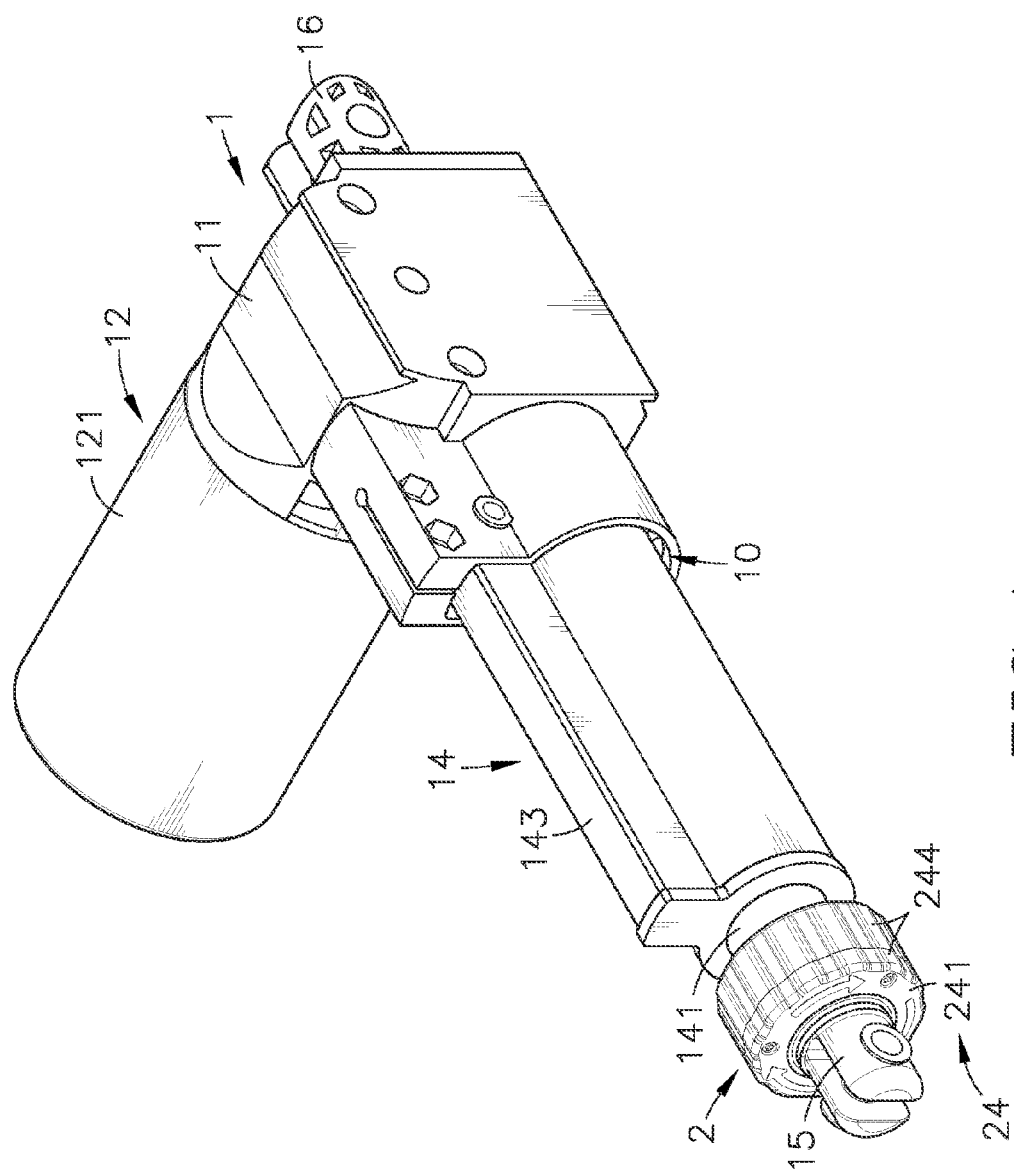
FIG. 1 is an oblique top elevational view of an electric push bar assembly in accordance with the present invention.
Figure 2:
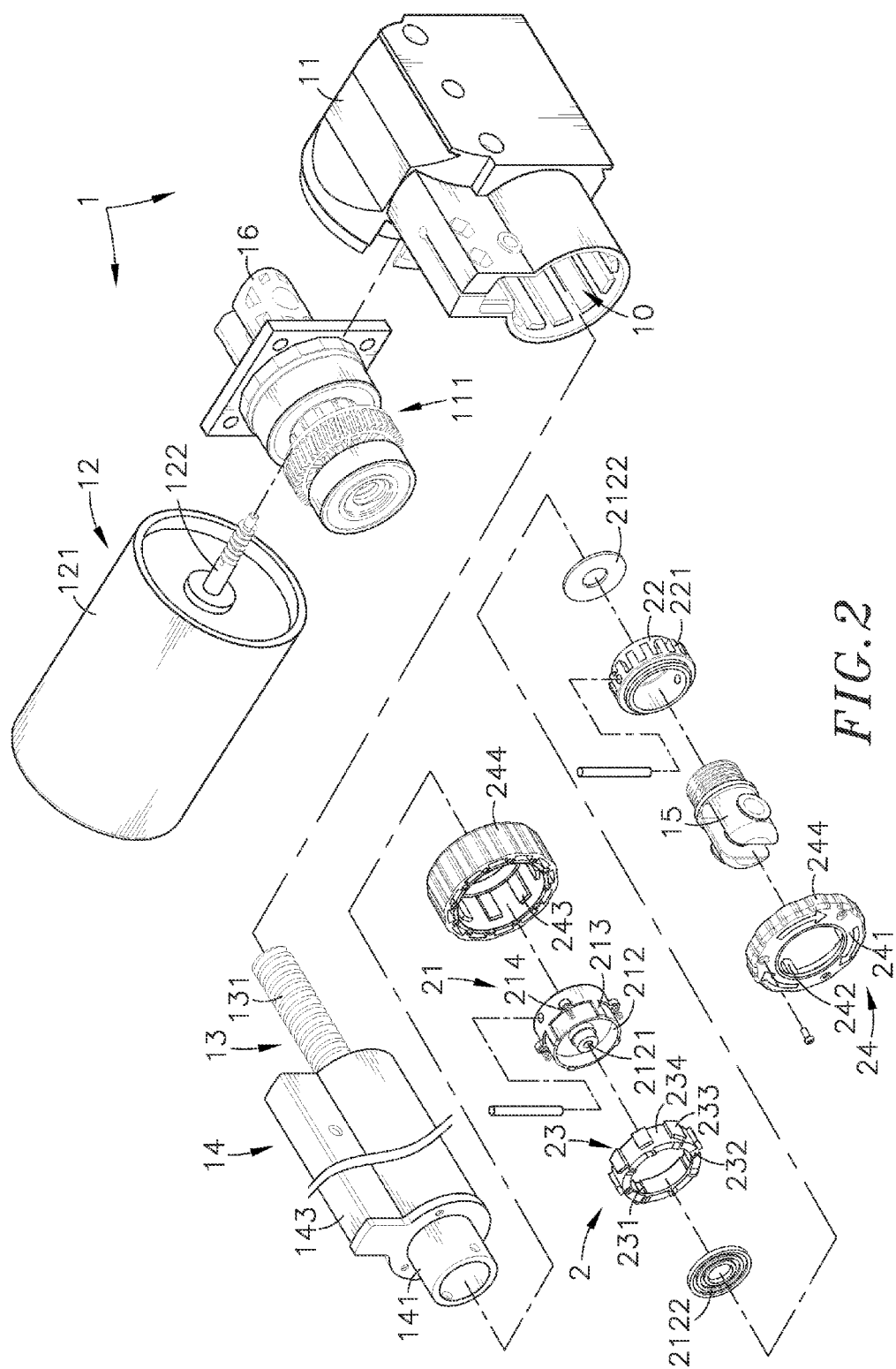
FIG. 2 is an exploded view of the electric push bar assembly in accordance with the present invention.
Figure 3:
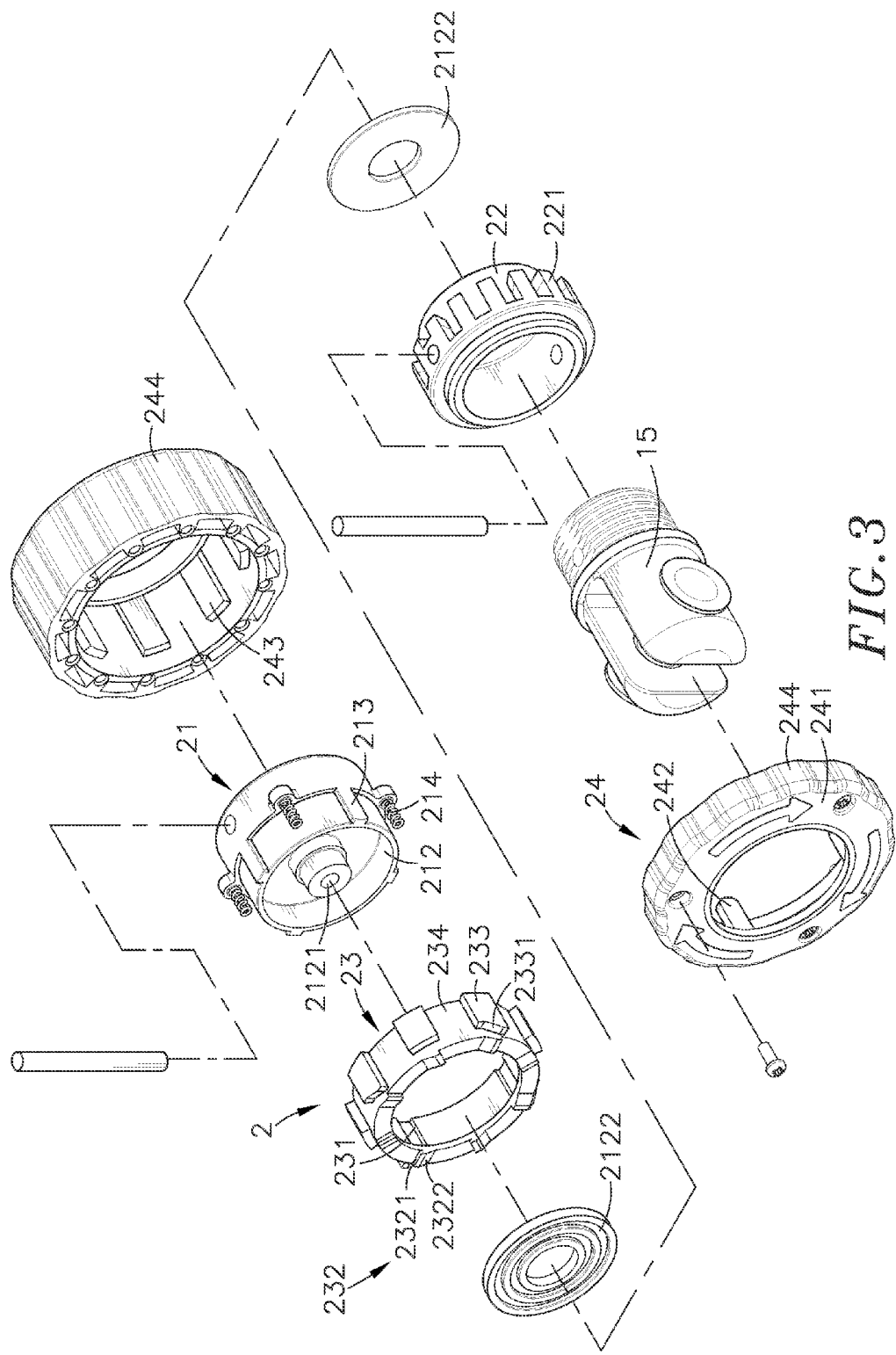
FIG. 3 is an exploded view of the release mechanism of the electric push bar assembly in accordance with the present invention.
Figure 4:
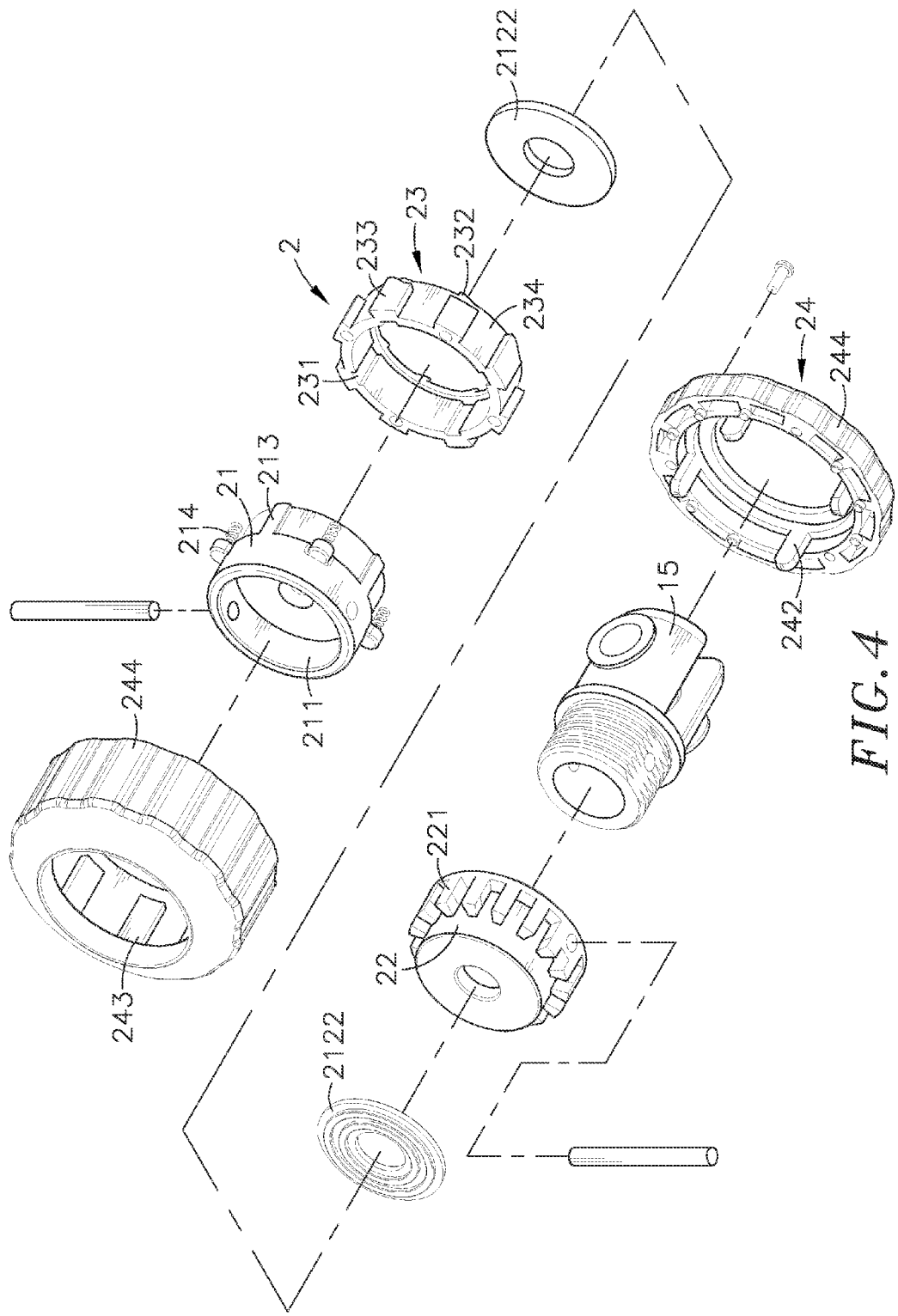
FIG. 4 corresponds to FIG. 3 when viewed from another angle.
Figure 5:
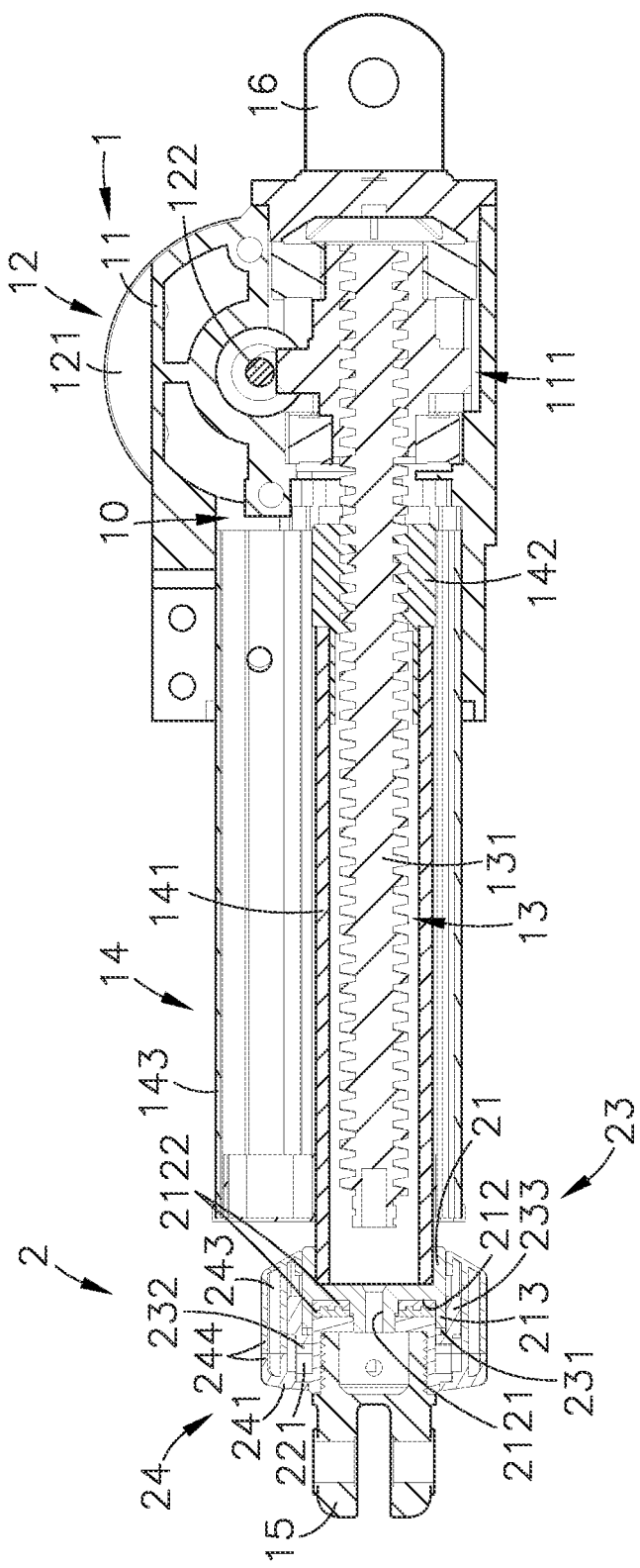
FIG. 5 is a sectional side view of the electric push bar assembly in accordance with the present invention.
Figure 6:
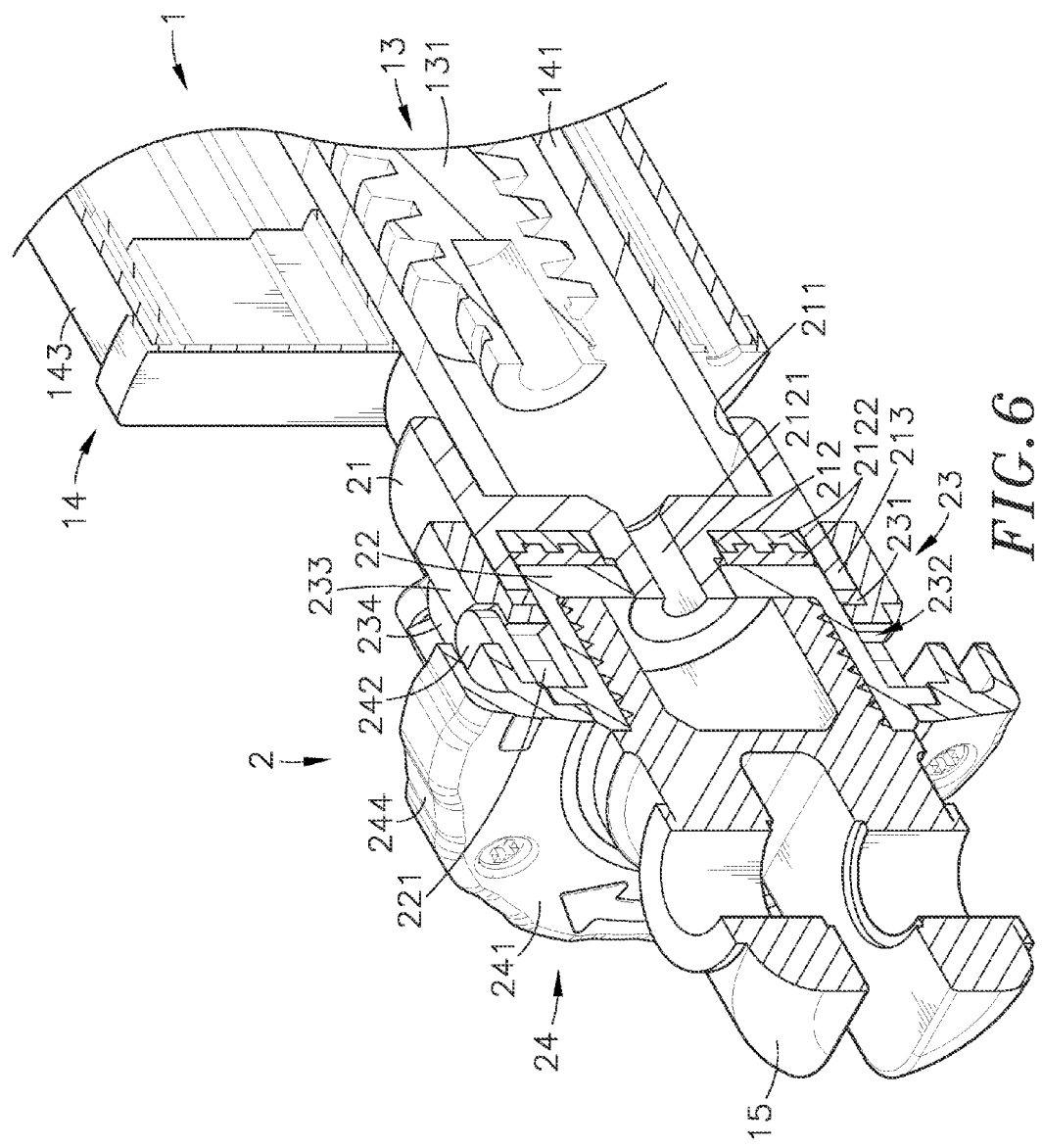
FIG. 6 is a sectional elevational view of a part of the present invention, illustrating the relationship between the release mechanism and the transmission screw of the transmission mechanism of the electric push bar.

Referring to FIGS. 1-6, an electric push bar assembly in accordance with the present invention is shown. The electric push bar assembly comprises an electric push bar 1 and a release mechanism 2.

The electric push bar 1 comprises a shell member 11, a gear set 111, a power drive 12, a transmission mechanism 13, a retractable tube 14, a connector 15, and a mounting member 16. The shell member 11 defines therein an accommodation chamber 10 that accommodates the gear set 111. The power drive 12 comprises a motor 121 affixed to the shell member 11, and a drive shaft 122 meshed with the gear set 111 and rotatable by the motor 121. The transmission mechanism 13 comprises a transmission screw 131 connected to and rotatable by the gear set 111. The retractable tube 14 is coupled to and movable by the transmission screw 131 of the transmission mechanism 13. The connector 15 is connected to one end of the retractable tube 14 opposite to the transmission screw 131 of the transmission mechanism 13 through the release mechanism 2. The mounting member 16 is connected to one side, namely, the rear side of the shell member 11 opposite to the retractable tube 14.

Further, the retractable tube 14 comprises an inner tube 141 surrounding the transmission screw 131 of the transmission mechanism 13, an internally threaded stub tube 142 fixedly connected to one end of the inner tube 141 and threaded onto the transmission screw 131 of the transmission mechanism 13, and an outer sleeve 143 fixedly connected to the front side of the shell member 11 opposite to the mounting member 16 to surround the inner tube 141. Thus, rotating the transmission screw 131 of the transmission mechanism 13 clockwise or counter-clockwise causes the inner tube 141 to move with the internally threaded stub tube 142 linearly along the transmission screw 131 of the transmission mechanism 13 toward the outside or inside of the outer sleeve 143.

The release mechanism 2 is coupled between the retractable tube 14 and connector 15 of the electric push bar 1, comprising a connection socket 21, a fixed socket 22, a clutch socket 23 and a rotary operating member 24. The connection socket 21 comprises a connection hole 211 defined in one side thereof and connected to an opposite end of the inner tube 141, a coupling hole 212 defined in an opposite side thereof and attachable to the fixed socket 22, an axle 2121 axially disposed in the coupling hole 212 at the center, two friction plates 2122 mounted in the coupling hole 212 around the axle 2121, a plurality of axial rails 213 equiangularly spaced around an outer perimeter thereof, and a plurality of spring members 214 axially mounted in the outer perimeter thereof and respectively disposed between each two adjacent axial rails 213. The fixed socket 22 is connected with the connector 15, having a plurality of engagement teeth 221 equiangularly spaced around the outer perimeter.

The aforesaid clutch socket 23 is attached to the outer perimeter of the connection socket 21, comprising a plurality of axial sliding grooves 231 equiangularly spaced around an inner perimeter thereof and respectively slidably coupled to the axial rails 213 of the connection socket 21, a plurality of engagement tooth blocks 232 equiangularly disposed at a front side thereof and respectively engaged with the engagement teeth 221 of the fixed socket 22, a plurality of pushing blocks 233 and spacer grooves 234 alternatively and equiangularly spaced around an outer perimeter thereof. Further, each engagement tooth block 232 of the clutch socket 23 defines a stepped lateral stop edge 2321 and a beveled bearing edge 2322. Further, each pushing block 233 defines a beveled front guide edge 2331. Further, the rotary operating member 24 is attached to the outer perimeter of the fixed socket 22, comprising a ring shell 241 rotatable by a user, a plurality of push blocks 242 located on an inside wall of the ring shell 241 and respectively stopped against the pushing blocks 233 of the clutch socket 23, a plurality of stopper ribs 243 located on the inside wall of the ring shell 241 and respectively inserted into the spacer grooves 234 of the clutch socket 23, and a corrugated (or toothed) grip 244 formed integral with the periphery of the ring shell 241.

Further, the connection hole 211 of the connection socket 21 of the release mechanism 2 is attached onto the front end of the inner tube 141 of the retractable tube 14 of the electric push bar 1 opposite to the transmission screw 131 of the transmission mechanism 13, and then locked thereto with a lock pin (not labelled). Further, the fixed socket 22 is attached to one end, namely, the rear end of the connector 15, and then locked thereto with a lock pin (not labelled). It is to be noted that any of a variety of other fastening techniques such as screw joint, feather key groove joint, welding process and etc. can be used for the fixation between the connection socket 21 and the inner tube 141, and the fixation between the fixed socket 22 and the connector 15. Further, the ring shell 241 of the rotary operating member 24 can be formed of two mating ring parts secured together by plugging plug rods at one ring part into respective plug holes at the other ring part and then fixedly fastened together with screws.

Figure 7:
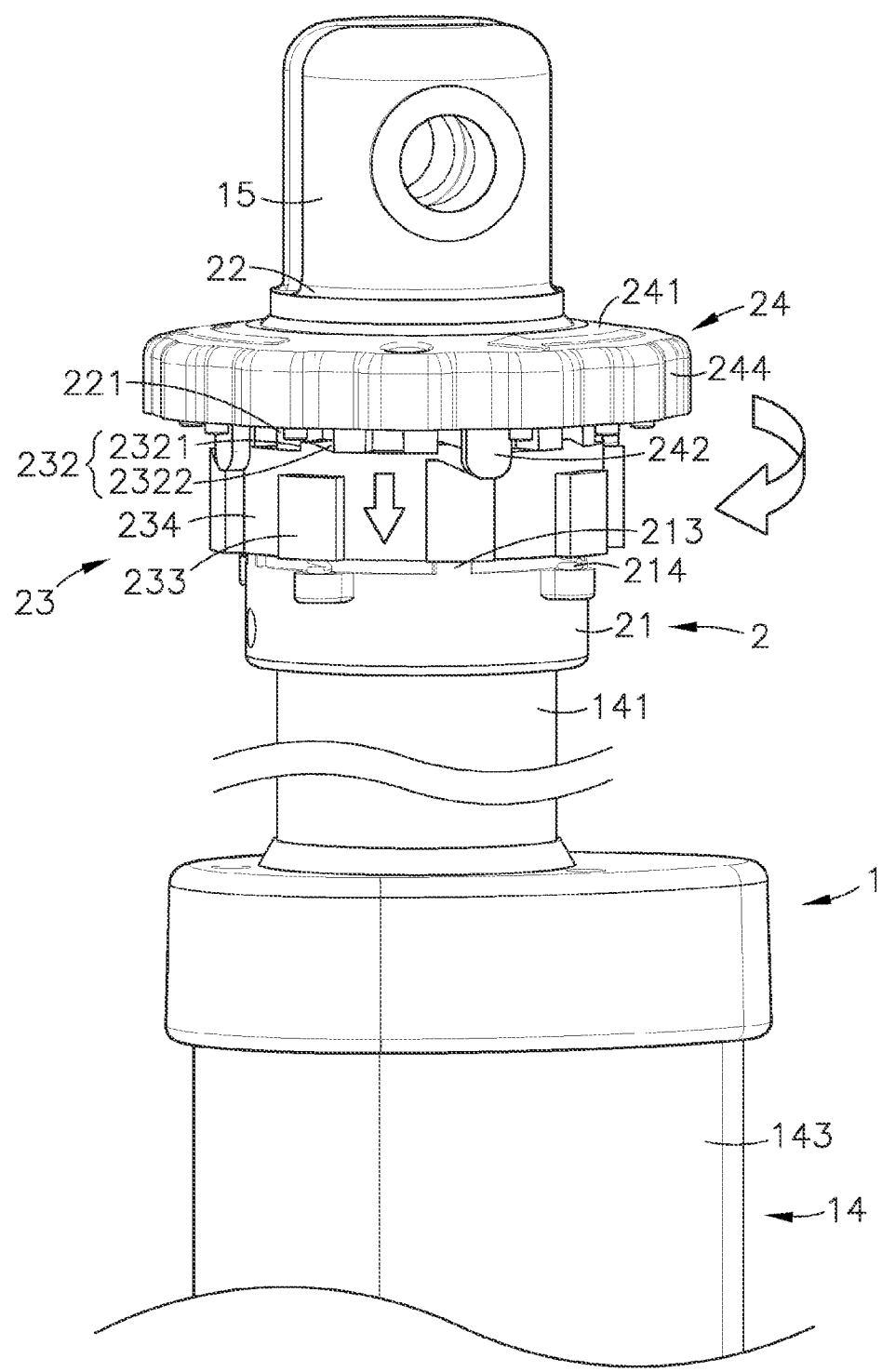
FIG. 7 is a schematic side view of the electric push bar assembly in accordance with the present invention.
Figure 8:
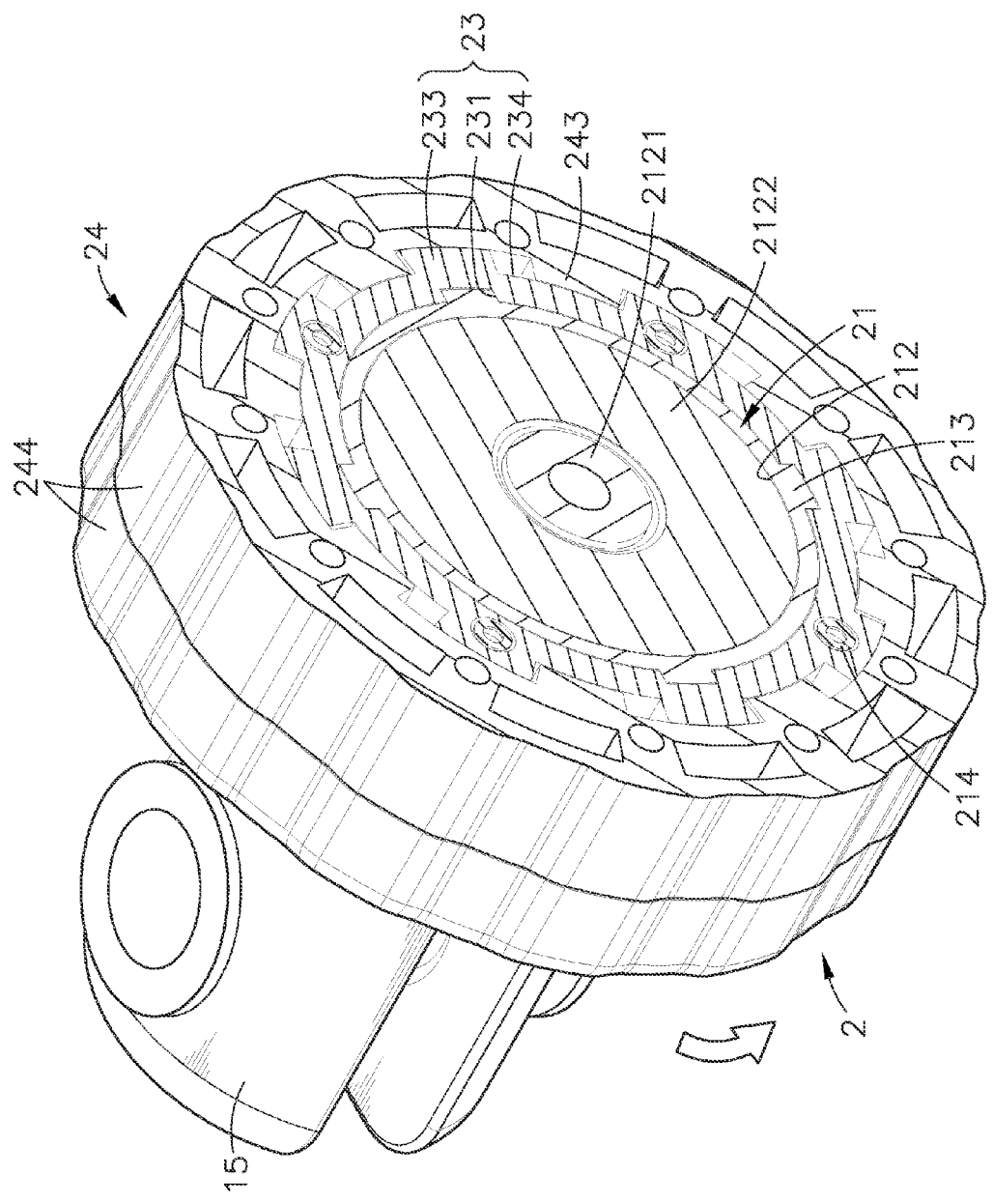
FIG. 8 is a cross-sectional elevational view, in an enlarged scale, of a part of FIG. 7, illustrating the internal arrangement of the release mechanism.
Figure 9:
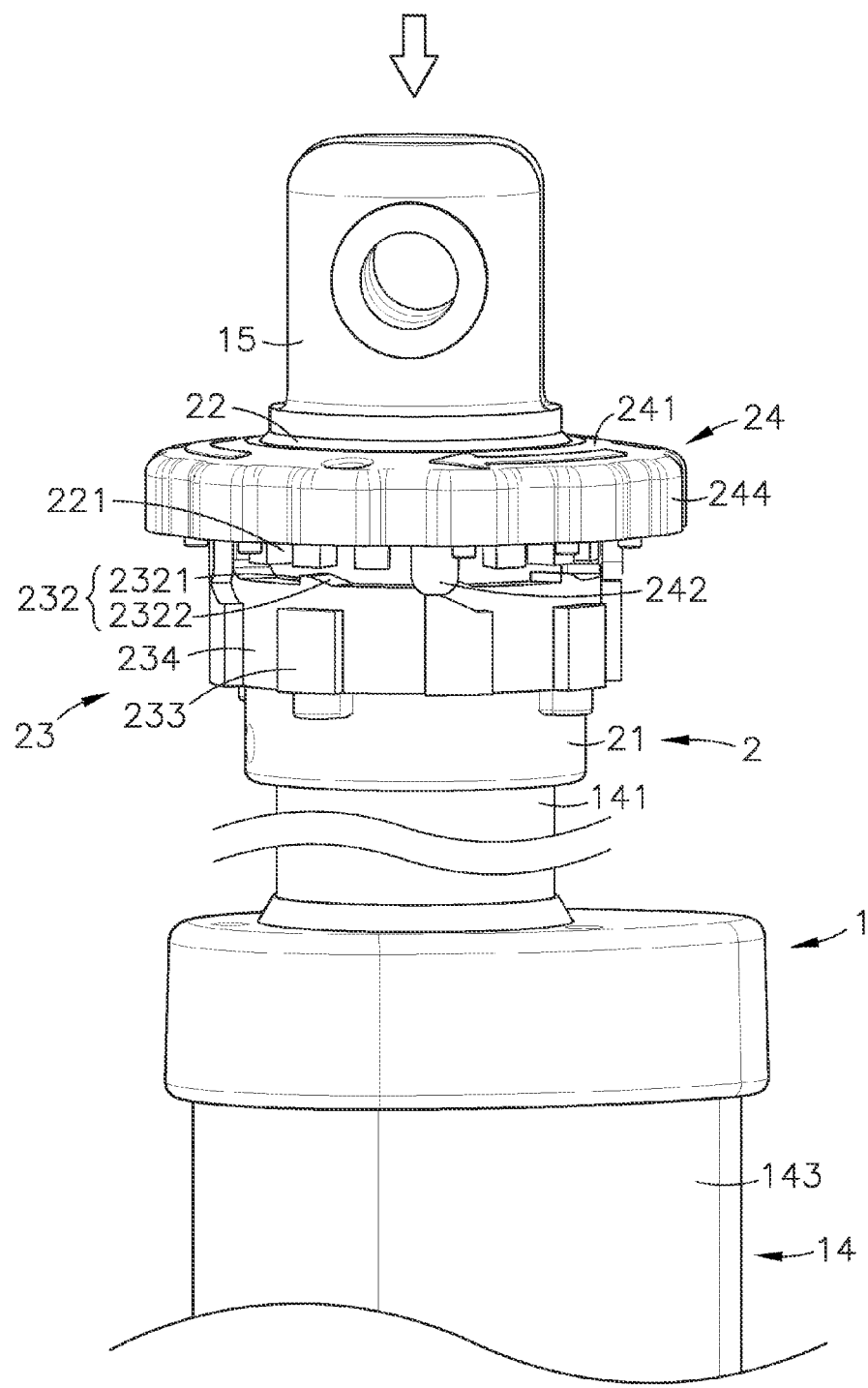
FIG. 9 corresponds to FIG. 7, illustrating the rotary operating member operated.
Figure 10:
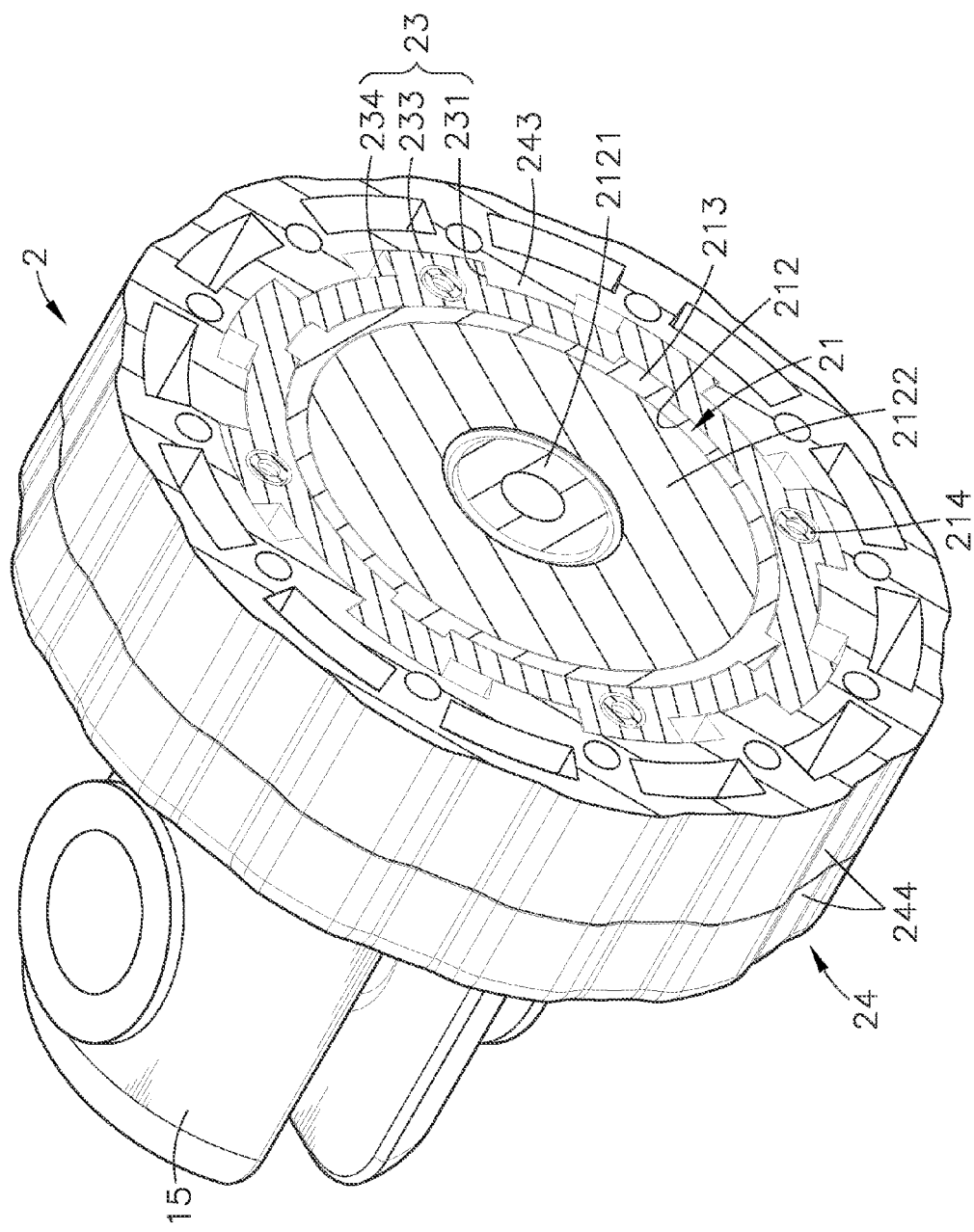
FIG. 10 corresponds to FIG. 8, illustrating the position of the clutch socket changed.
Figure 11:
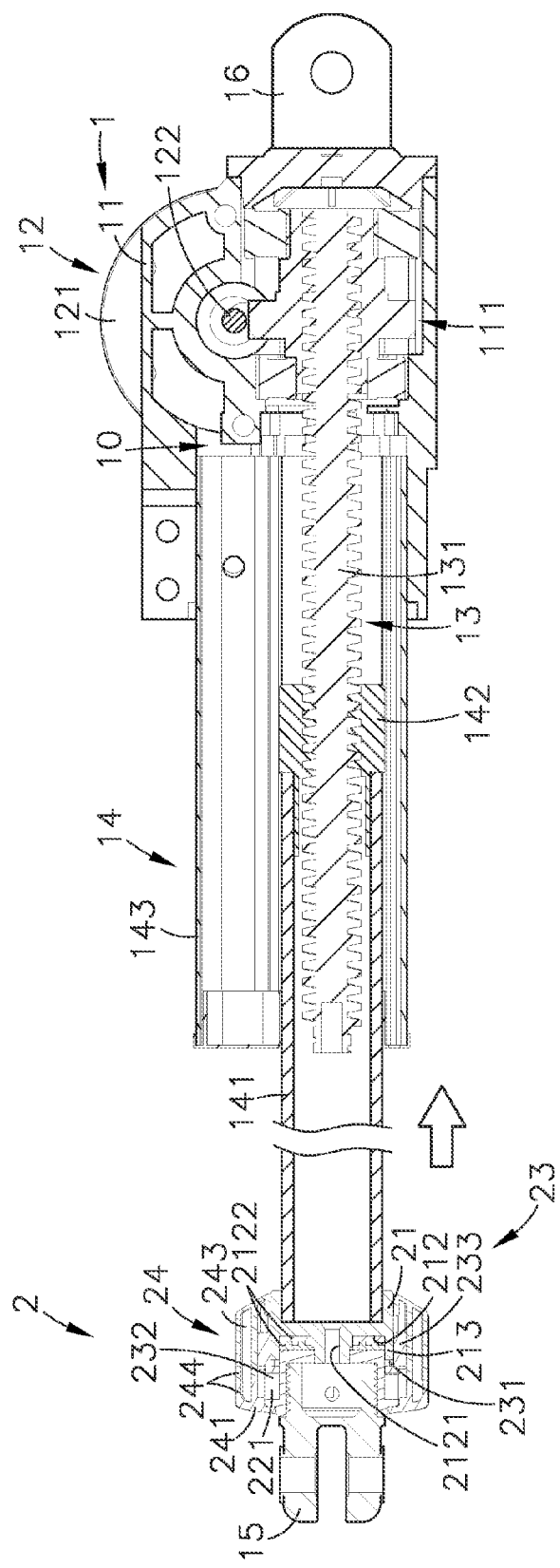
FIG. 11 corresponds to FIG. 5, illustrating the inner tube of the retractable tube moved relative to the outer sleeve.
Figure 12:
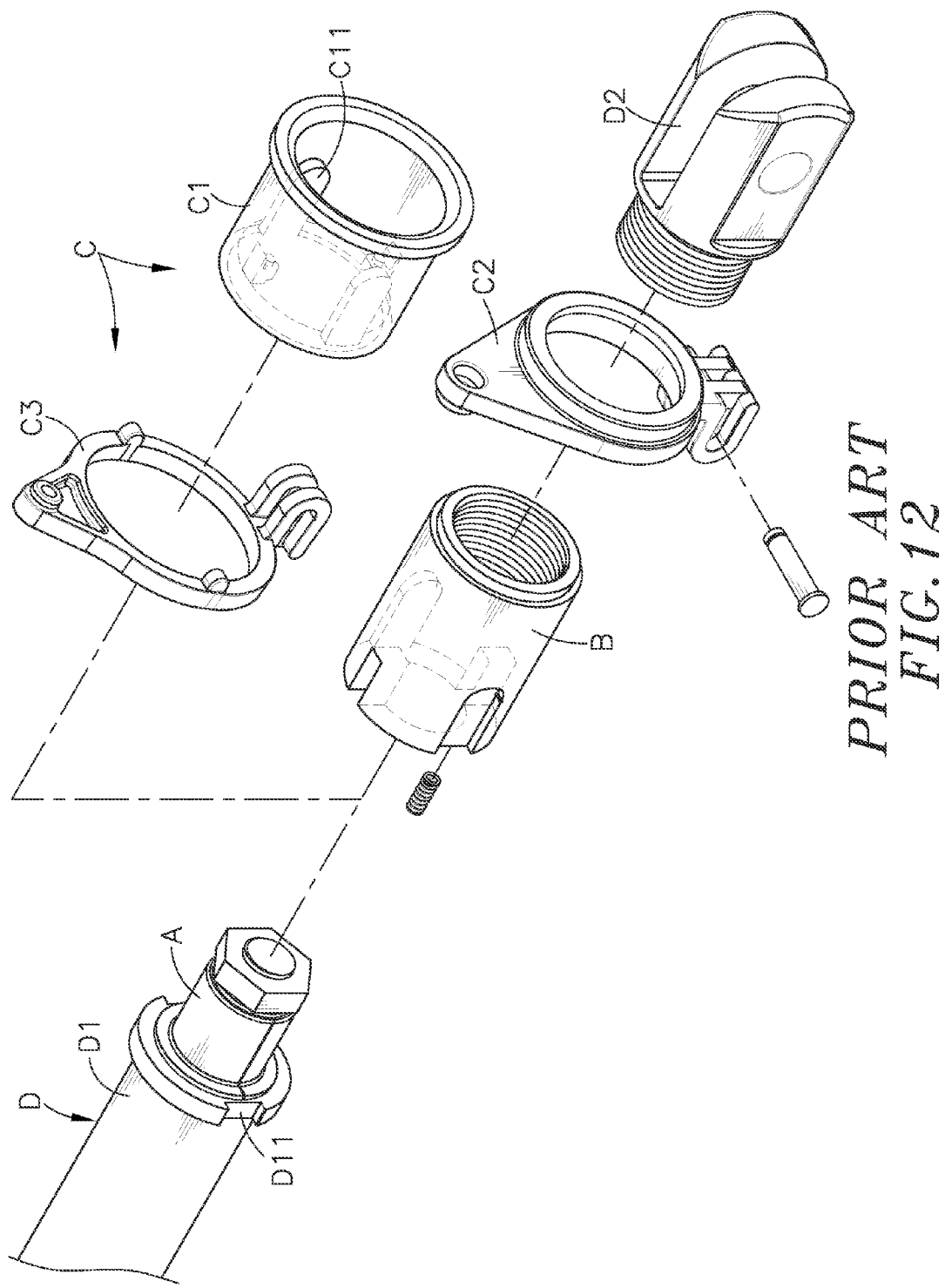
FIG. 12 is an exploded view of an electric push bar assembly according to the prior art.

Referring to FIGS. 7-11, the electric push bar assembly of the present invention can be used in an electric bed, electric massage chair, lifter, or a linkage or movable mechanism of a machine or equipment. At this time, the connector 15 and mounting member 16 of the electric push bar 1 are respectively fixedly connected to two movable parts of the electric bed, electric massage chair or lifter, or the linkage or movable mechanism of the machine or equipment with screws. Because the release mechanism 2 is coupled between the retractable tube 14 and connector 15 of the electric push bar 1, the release mechanism 2 does not occupy any internal space of the electric push bar 1. Thus, the use of the release mechanism 2 in the electric push bar assembly needs not to change the specification of the electric push bar 1, facilitating fabrication and saving installation space.

After installation, the spring members 214 of the connection socket 21 of the release mechanism 2 are respectively stopped in respective locating holes (not labelled) in a rear side of the clutch socket 23, forcing the engagement tooth blocks 232 into engagement with the engagement teeth 221 of the fixed socket 22. At this time, the stepped lateral stop edges 2321 of the engagement tooth blocks 232 of the clutch socket 23 are respectively stopped against the engagement teeth 221 of the fixed socket 22 and the axial sliding grooves 231 of the clutch socket 23 are respectively coupled to the axial rails 213 of the connection socket 21, stopping the connection socket 21, the fixed socket 22, the clutch socket 23 and the retractable tube 14 from rotation relative to one another. When starting the motor 121 of the power drive 12 to rotate the drive shaft 122 and the gear set 111, the transmission screw 131 of the transmission mechanism 13 will be driven by the gear set 111 to move the retractable tube 14 linearly relative to the shell member 11 between an extended position and a received position, forcing the connector 15 to move the connected external member (not shown) in adjusting the elevational or angular position.

When using the present invention, operate the grip 244 to rotate the ring shell 241 of the rotary operating member 24 of the release mechanism 2 in the clockwise direction through a predetermined angle to move the push blocks 242 along the beveled front guide edges 2331 of the push blocks 233 of the clutch socket 23, forcing the clutch socket 23 to move axially toward the retractable tube 14 of the electric push bar 1 and to compress the spring members 214 of the connection socket 21. Subject to coupling between the axial sliding grooves 231 of the clutch socket 23 and the axial rails 213 of the connection socket 21, the clutch socket 23 can be moved axially toward the retractable tube 14 of the electric push bar 1 smoothly and stably.

When moving the push blocks 242 along the beveled front guide edges 2331 of the push blocks 233 of the clutch socket 23 to force the clutch socket 23 axially toward the retractable tube 14 of the electric push bar 1, the engagement tooth blocks 232 of the clutch socket 23 are gradually disengaged from the engagement teeth 221 of the fixed socket 22, enabling the connector 15 to be forced by an external force to move the fixed socket 22 and the connection socket 21, causing the inner tube 141 to be retracted subject to reversed rotation of the internally threaded stub tube 142 relative to the transmission screw 131. Thus, when power failed or when the electric push bar assembly is damaged, the retractable tube 14 can be retracted manually to lower the electric bed, electric massage chair or lifter, or the linkage or movable mechanism of the machine or equipment in which the electric push bar assembly is installed.

Further, when rotating the ring shell 241 of the rotary operating member 24, each stopper rib 243 will be moved from one side of the associating spacer groove 234 to the opposite side to limit the angle of rotation of the ring shell 241, preventing separation between the push blocks 242 of the rotary operating member 24 and the pushing blocks 233 of the clutch socket 23 to cause further damage. Repeatedly operating the rotary operating member 24 can disengage the engagement tooth blocks 232 of the clutch socket 23 from the engagement teeth 221 of the fixed socket 22, or the clutch socket 23 can be forced back to its former position by the spring members 214 of the connection socket 21, moving the push blocks 242 of the rotary operating member 24 along the beveled front guide edges 2331 of the pushing blocks 233 to the former position. Thus, the release mechanism 2 enables the electric push bar assembly to be conveniently adjusted subject to the weight of the load to fit different application requirements.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An electric push bar assembly, comprising:
an electric push bar comprising a shell member, a gear set mounted in said shell member, a power drive adapted for rotating said gear set, a transmission mechanism, said transmission mechanism comprising a transmission screw coupled to and rotatable by said gear set, a retractable tube coupled to said transmission screw and movable linearly upon rotation of said transmission screw, and a connector connected to one end of said retractable tube opposite to said transmission screw through a release mechanism; and
a release mechanism coupled between said retractable tube and said connector of said electric push bar, a release mechanism comprising a connection socket connected to said retractable tube, a fixed socket connected to said connector, said fixed socket comprising a plurality of engagement teeth equiangularly spaced around the periphery thereof, a clutch socket axially slidably coupled to said connection socket, said clutch socket comprising a plurality of engagement tooth blocks equiangularly disposed at a front side thereof and respectively engaged with said engagement teeth of said fixed socket and at least one pushing block located on an outer perimeter thereof, and a rotary operating member mounted around said fixed socket, said rotary operating member comprising a ring shell, said ring shell comprising at least one push block located on an inner perimeter thereof and stopped against said at least one pushing block of said clutch socket for enabling said clutch socket to be moved by said rotary operating member to disengage said engagement tooth blocks from said engagement teeth upon rotation of said ring shell by an external force.

2. The electric push bar assembly as claimed in claim 1, wherein said power drive of said electric push bar comprises a motor, and a drive shaft meshed with said gear set and rotatable by said motor; said retractable tube comprises an inner tube surrounding said transmission screw of said transmission mechanism, an internally threaded stub tube fixedly connected to one end of said inner tube and threaded onto said transmission screw of said transmission mechanism, and an outer sleeve fixedly connected to said shell member opposite to said mounting member to surround said inner tube.

3. The electric push bar assembly as claimed in claim 1, wherein said connection socket of said release mechanism further comprises a connection hole defined in one side thereof and connected to said retractable tube, a coupling hole defined in an opposite side thereof and attachable to said fixed socket, and an axle axially disposed in said coupling hole at the center.

4. The electric push bar assembly as claimed in claim 1, wherein said connection socket of said release mechanism comprises a plurality of axial rails equiangularly spaced around an outer perimeter thereof, and a plurality of spring members axially mounted in the outer perimeter thereof and respectively disposed between each two adjacent said axial rails; said clutch socket is supported on said spring members of said connection socket, comprising a plurality of axial sliding grooves respectively coupled to said axial rails of said connection socket.

5. The electric push bar assembly as claimed in claim 1, wherein each said engagement tooth block of said clutch socket defines a stepped lateral stop edge stopped against one respective said engagement tooth of said fixed socket.

6. The electric push bar assembly as claimed in claim 1, wherein each said engagement tooth block of said clutch socket defines a beveled front guide edge movable by one said push block of said ring shell of said rotary operating member to disengage said engagement tooth blocks of said clutch socket from said engagement teeth of said fixed socket.

7. The electric push bar assembly as claimed in claim 1, wherein said clutch socket of said release mechanism comprises a plurality of said pushing blocks equiangularly spaced around the outer perimeter thereof, and a plurality of spacer grooves respectively defined between each two adjacent said pushing blocks; said ring shell of said rotary operating member further comprises a plurality of stopper ribs respectively suspended in said spacer grooves of said clutch socket to limit the angle of rotation of said rotary operating member relative to said clutch socket.

8. The electric push bar assembly as claimed in claim 1, wherein said ring shell of said rotary operating member comprises a plurality of said push blocks equiangularly spaced around the inner perimeter thereof, and a corrugated grip located on an outer perimeter thereof.

* * * * *